(12) United States Patent
Negishi et al.

(10) Patent No.: US 11,485,402 B2
(45) Date of Patent: Nov. 1, 2022

(54) STEERING GEARBOX

(71) Applicant: YAMADA MANUFACTURING CO., LTD., Kiryu (JP)

(72) Inventors: Kazuyuki Negishi, Kiryu (JP); Tatsuya Negishi, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 0 days.

(21) Appl. No.: 17/117,496

(22) Filed: Dec. 10, 2020

(65) Prior Publication Data
US 2021/0269082 A1 Sep. 2, 2021

(30) Foreign Application Priority Data
Feb. 28, 2020 (JP) .............................. JP2020-032741

(51) Int. Cl.
B62D 3/00 (2006.01)
B62D 3/12 (2006.01)
F16H 19/04 (2006.01)
F16C 17/02 (2006.01)
F16H 57/021 (2012.01)

(52) U.S. Cl.
CPC .............. B62D 3/126 (2013.01); F16C 17/02 (2013.01); F16H 19/04 (2013.01); F16H 57/021 (2013.01); F16C 2361/61 (2013.01); F16H 2019/046 (2013.01)

(58) Field of Classification Search
CPC . B62D 3/126; B62D 3/12; F16C 17/02; F16C 2361/61; F16C 33/26; F16C 2220/02; F16C 33/08; F16C 33/128; F16C 33/145; F16H 19/04; F16H 57/021; F16H 2019/046
See application file for complete search history.

(56) References Cited

U.S. PATENT DOCUMENTS

| 4,127,186 | A | * | 11/1978 | Koyano | .................... | B62D 5/22 |
| | | | | | | 180/428 |
| 4,721,175 | A | * | 1/1988 | Butler | ...................... | B62D 5/22 |
| | | | | | | 180/428 |
| 5,694,810 | A | * | 12/1997 | Iwasa | ...................... | B62D 5/12 |
| | | | | | | 74/422 |
| 7,367,421 | B2 | * | 5/2008 | Saito | ........................ | B62D 3/12 |
| | | | | | | 180/426 |
| 2020/0079419 | A1 | * | 3/2020 | Shiino | ...................... | B62D 5/04 |

FOREIGN PATENT DOCUMENTS

| JP | 2004268606 | A | * | 9/2004 |
| JP | 2010-215094 | | | 9/2010 |

* cited by examiner

Primary Examiner — Victor L Macarthur
(74) Attorney, Agent, or Firm — Rankin, Hill & Clark LLP

(57) ABSTRACT

A steering gearbox is equipped with a casing, a rack shaft, and a plurality of bushes. The rack shaft is accommodated in a casing to be movable in an axial direction. The plurality of bushes support the rack shaft to be movable in the axial direction and are attached to the casing.

6 Claims, 6 Drawing Sheets

STEERING GEARBOX

CROSS-REFERENCE TO RELATED APPLICATION

Priority is claimed on Japanese Patent Application No. 2020-032741, filed Feb. 28, 2020, the content of which is incorporated herein by reference.

BACKGROUND OF THE INVENTION

Field of the Invention

The present invention relates to a steering gearbox.

Description of Related Art

A vehicle is equipped with, for example, a rack and pinion type steering device. In the steering device, a bush is attached to an accommodating portion of a gearbox, and a rack shaft is supported by a bush to be slidable in an axial direction. In the steering device, a load applied to tires while a vehicle travels is transmitted to the rack shaft via a tie rod and then supported by the bush (see, for example, Japanese Unexamined Patent Application, First Publication No. 2010-215094).

However, for example, a vehicle capable of traveling on rough terrain (for example, a buggy or the like (especially a multipurpose four-wheel buggy for off-road use)) is considered to require specifications having a large tie rod angle. When the tie rod angle increases, among component forces of the load acting on the rack shaft via the tire, a component along a vertical direction becomes increased. As a result, the load transmitted to the bush easily increases, and the strength required for the bush also increases.

If the tie rod angle increases, it is difficult to appropriately restrict the displacement (tilt in the vertical direction) due to falling of the rack shaft with respect to the bush.

An aspect according to the present invention has been made in consideration of the above-mentioned circumstances, and an object thereof is to provide a steering gearbox that can reduce a surface pressure acting between the bush and the rack shaft to appropriately secure strength and preferably restrict displacement due to falling of the rack shaft.

SUMMARY OF THE INVENTION

In order to solve the above problems, the present invention has adopted the following aspects.

(1): A steering gearbox according to one aspect of the present invention includes a pinion shaft having a pinion gear; a rack shaft having a rack gear meshing with the pinion gear, a tie rod swingably connected between the rack shaft and wheels; and a casing configured to support the rack shaft such that it is movable in an axial direction via a bush, in which a plurality of bushes are provided side by side in the axial direction and each are made of metal.

According to the aforementioned aspect (1), since a plurality of bushes are provided side by side in the axial direction, an axial length of all of the plurality of bushes (hereinafter, referred to as a bush length) can be made longer than that of one bush. That is, the contact area between the rack shaft and the plurality of bushes can be increased. As a result, the surface pressure due to the load transmitted to the plurality of bushes can be reduced, and the strength of the plurality of bushes can be suitably secured.

Falling of the rack shaft is restricted by it coming into contact with diagonally located portions at opening edges at the two ends of the bush. According to the aforementioned aspect (1), by increasing the bush length of the plurality of entire bushes, the timing at which the rack shaft comes into contact with the bushes becomes earlier. This makes it possible to suitably minimize the displacement due to the falling of the rack shaft.

Further, by providing the plurality of bushes in the axial direction, each bush can move relative to the others due to the spaces between the bushes and the casing or between the respective bushes. Therefore, as compared with a case where the same bush length is secured by one bush, it becomes easier for each bush to suitably follow the displacement due to the collapse of the rack shaft. Therefore, for example, the deformation of the plurality of bushes due to the rack shaft can be minimized.

(2): In the aforementioned aspect (1), the plurality of bushes may be the same member.

According to the aforementioned aspect (2), by forming a plurality of bushes with the same member, it is not necessary to form various bushes having different shapes, the manufacturing cost of each bush can be minimized, and it can be made less likely for defective bushes to occur. Further, by forming the plurality of bushes using the same member, for example, a uniform inner diameter accuracy for the plurality of bushes can be secured. This makes it possible for the rack shaft to be supported by the plurality of bushes such that it becomes smoothly movable in the axial direction.

(3): In the aforementioned aspect (1) or (2), the plurality of two bushes may be disposed in the axial direction.

According to the aforementioned aspect (3), for example, when the rack shaft is displaced due to collapse, the rack shaft comes into contact with both end edges of each bush in the axial direction. When the rack shaft is displaced due to collapse, the rack shaft can be supported by the two bushes in a well-balanced manner.

(4): In any one of the aforementioned aspects (1) to (3), in the bush, chamfered portions may be formed in a part in which an inner peripheral surface and an end surface facing a first side in the axial direction intersect, and in a part in which the inner peripheral surface and an end surface facing a second side in the axial direction intersects, respectively.

According to the aforementioned aspect (4), since the rack shaft comes into contact with the chamfered portion by the displacement due to collapse of the rack shaft, it is possible to reduce the surface pressure acting between the rack shaft and the bush. This makes it easier to secure the strength of the bush.

(5): In any one of the aforementioned aspects (1) to (4), the plurality of bushes may be collectively held between a protrusion formed on the casing and a stopper fitted in the casing.

According to the aforementioned aspect (5), because the axial movement of the bush with respect to the casing can be regulated, the load transmitted from the rack shaft can be suitably supported by the plurality of entire bushes, and the displacement due to the collapse of the rack shaft can be suitably regulated by the plurality of entire bushes.

(6): In any one of the aforementioned aspects (1) to (5), the plurality of bushes may include a first bush, and a second bush having a dimension in the axial direction longer than the first bush, and an amount of protrusion of the rack shaft in the axial direction from the second bush may be longer than an amount of protrusion in the axial direction from the first bush.

According to the aforementioned aspect (6), when the rack shaft is displaced due to collapse, the side of the rack shaft having a large amount of protrusion from the bush easily comes into contact with the bush (the second bush) first. Therefore, when the rack shaft is displaced due to collapse, the length of the second bush with which the rack shaft comes into contact first is made relatively long, which makes it easier to secure the strength of the second bush. As a result, durability can be improved.

(7): In any one of the aforementioned aspects (1) to (6), the plurality of bushes may be formed of a sintered material.

Here, for example, when a bush having a large axial length is formed of a sintered material, it is difficult to form a thin bush, and it is necessary to form a thick bush. When a thick bush is formed, the inner diameter of the casing that accommodates the bush becomes large, and the casing has an appearance of being large.

According to the aforementioned aspect (7), a plurality of bushes that support the rack shaft are configured. Therefore, it is possible to form a thin bush with a plurality of bushes as a sintered material, while suitably minimizing the axial length of each bush. As a result, the inner diameter of the casing that accommodates the bushes can be minimized such that it becomes small, and the casing can be made to have an appearance of being small.

According to the aspects of the present invention, the rack shaft is supported to be movable in the axial direction by a plurality of bushes. As a result, the surface pressure acting between the bush and the rack shaft can be reduced to appropriately secure the strength, and the displacement due to the collapse of the rack shaft can be suitably regulated.

DETAILED DESCRIPTION OF THE INVENTION

Next, an embodiment of the present invention will be described on the basis of the drawings. In the following description, although an example in which a steering gearbox 15 according to the present invention is adopted for a buggy as a vehicle will be described, the steering gearbox 15 according to the present invention can also be adopted for other vehicles.

<Buggy>

Figure 1:
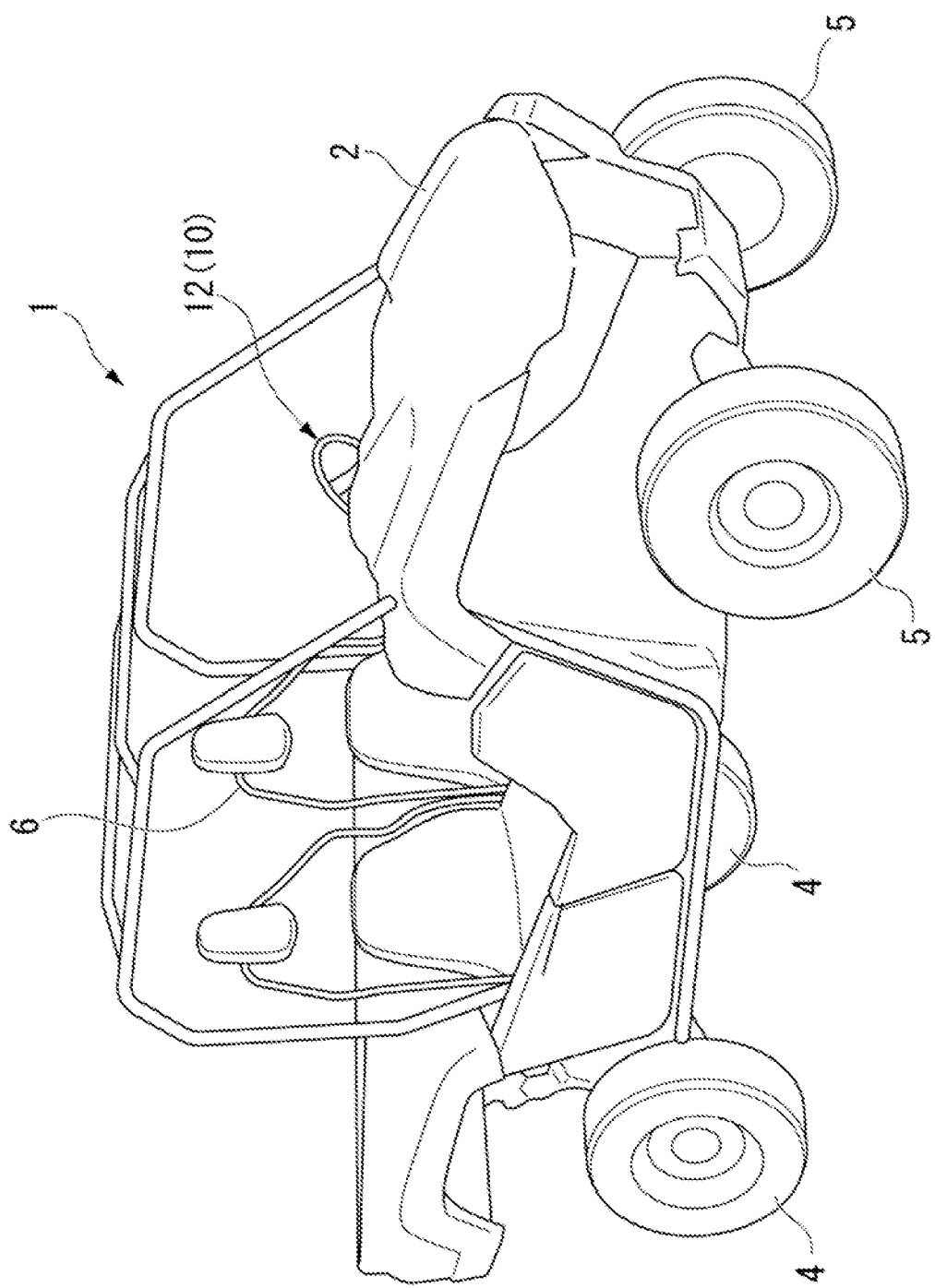
FIG. 1 is a perspective view of a buggy equipped with a steering gearbox according to an embodiment of the present invention.

FIG. 1 is a perspective view of a buggy 1 equipped with the steering gearbox 15. As shown in FIG. 1, the buggy 1 is equipped with a vehicle body 2, a pair of rear wheels 4 attached to a rear lower portion of the vehicle body 2, a pair of front wheels 5 attached to a front lower portion of the vehicle body 2, and a steering device 10 which steers the pair of front wheels 5. The steering wheel 12 of the steering device 10 is provided in a front part of a vehicle body of a driver seat 6.

<Steering Gearbox>

Figure 2:
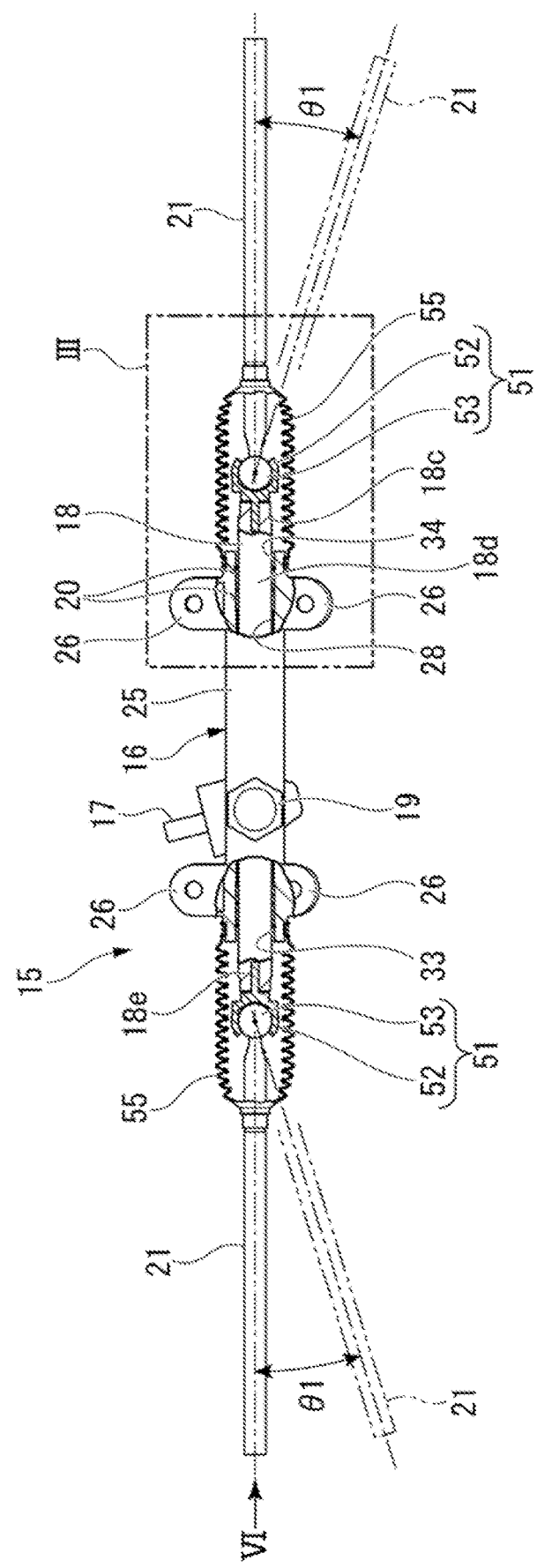
FIG. 2 is a front view in which a part of the steering gearbox of the embodiment is cut away.

FIG. 2 is a front view in which a part of the steering gearbox 15 is broken.

As shown in FIGS. 1 and 2, the steering device 10 is equipped with a steering wheel 12, a steering shaft (not shown), and a steering gearbox 15 (see FIG. 2). In the steering device 10, a pinion shaft 17 of the steering gearbox 15 is connected to the steering wheel 12 via a steering shaft (not shown) or the like. In the steering device 10, when a driver rotates of the steering wheel 12, the pinion shaft 17 rotates, and a rack shaft 18 that meshes with the pinion shaft 17 moves in an axial direction (a vehicle width direction). As a result, the pair of front wheels 5 are steered, and the pair of front wheels 5 are steered to a desired steering angle.

The steering gearbox 15 is equipped with a casing 16, a pinion shaft 17, a rack shaft 18, a guide 19, a plurality of bushes 20, and a pair of tie rods 21.

The casing 16 has a case body 25 formed in a substantially tubular shape, and an attaching portion 26 integrally provided in the case body 25. The casing 16 is disposed in a state in which the axial direction of the case body 25 is along a vehicle width direction by attaching the attaching portion 26 to the vehicle body 2.

A first accommodating portion 27 (see FIG. 6) and a second accommodating portion 28 are formed inside the case body 25.

The first accommodating portion 27 is formed inside the case body 25 along a direction intersecting the vehicle width direction. A lower end portion of the pinion shaft 17 is accommodated in the first accommodating portion 27. The pinion shaft 17 is rotatably (a direction A in FIG. 4) supported inside the first accommodating portion 27 via, for example, a ball bearing (not shown). In the shown example, the pinion shaft 17 is supported by the case body 25 in a state in which the axis 42 is tilted in the vertical direction.

Figure 3:
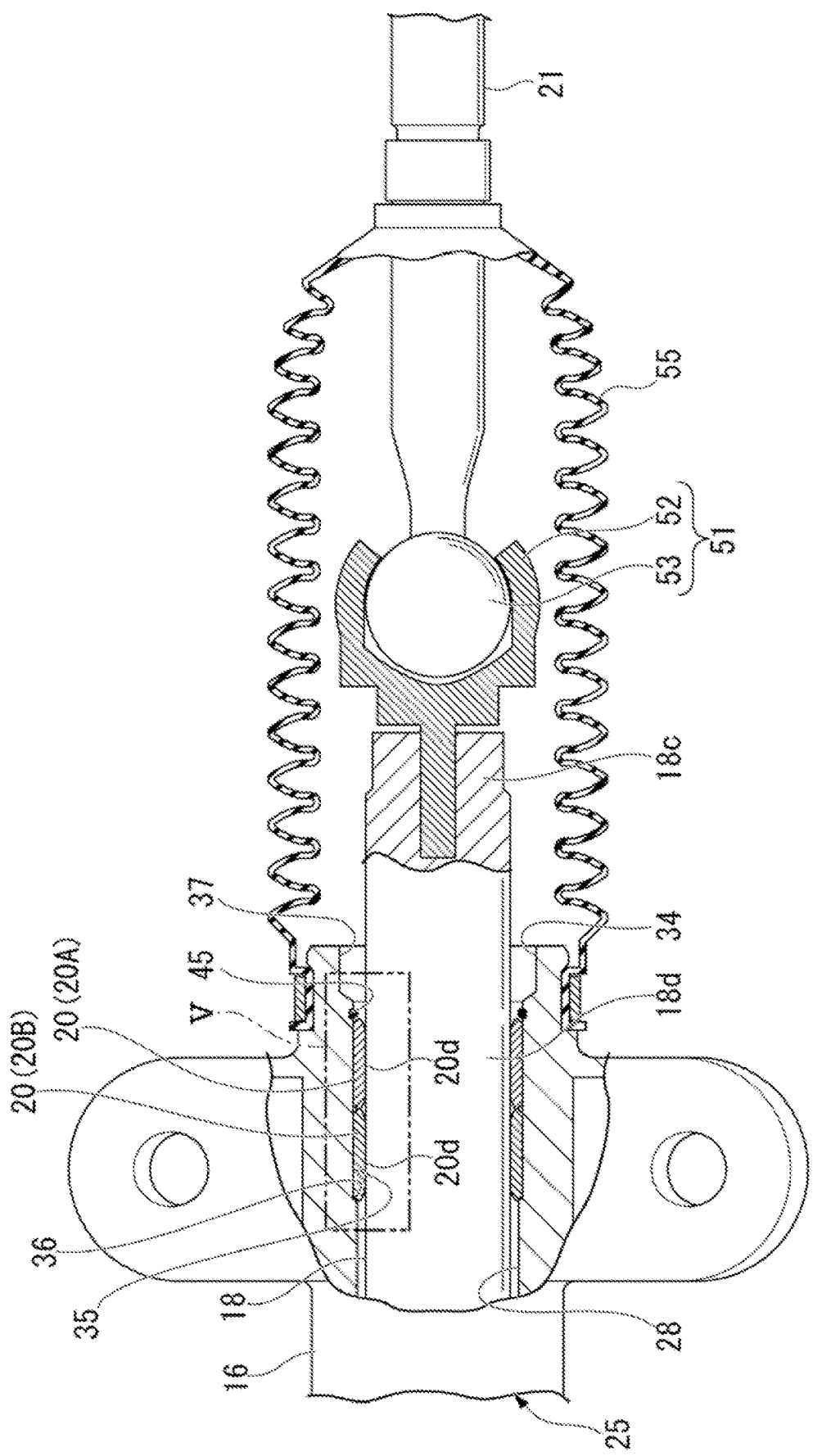
FIG. 3 is an enlarged cross-sectional view of a part III of FIG. 2.

FIG. 3 is an enlarged cross-sectional view of a part III of FIG. 2.

As shown in FIGS. 2 and 3, the second accommodating portion 28 is formed inside the case body 25 along the vehicle width direction to intersect the first accommodating portion 27. The second accommodating portion 28 communicates with the inside of the first accommodating portion 27 at a central portion in the vehicle width direction. Therefore, a pinion gear 31 (see FIG. 4) of the pinion shaft 17 accommodated in the first accommodating portion 27 is exposed in the second accommodating portion 28. The second accommodating portion 28 has a first opening portion 33, a second opening portion 34, a first enlarged diameter portion 35, a step portion (protrusion) 36, and a second enlarged diameter portion 37.

The first opening portion 33 is open at one end portion of both end portions of the case body 25. The second opening portion 34 is open at the other end portion of both end portions of the case body 25. The first enlarged diameter portion 35 is formed on the second opening portion 34 side of the second accommodating portion 28. An inner diameter of the first enlarged diameter portion 35 is larger than that of a portion of the second accommodating portion 28 located on the first opening portion 33 side. The step portion 36 is formed on a surface of the first enlarged diameter portion 35, facing outward in the vehicle width direction (a surface facing the second opening portion 34). The step portion 36 is a surface that connects an inner peripheral surface of the second accommodating portion 28 and an inner peripheral surface of the first enlarged diameter portion 35.

The second enlarged diameter portion 37 is formed in the second accommodating portion 28 on the side closer to the second opening portion 34 than to the first enlarged diameter portion 35. An inner diameter of the second enlarged diameter portion 37 is larger than that of the first enlarged diameter portion 35. The rack shaft 18 is accommodated in the second accommodating portion 28. The rack shaft 18 is disposed so that an axis is along the vehicle width direction, and is accommodated in the second accommodating portion 28 to be movable in the axial direction.

Figure 4:
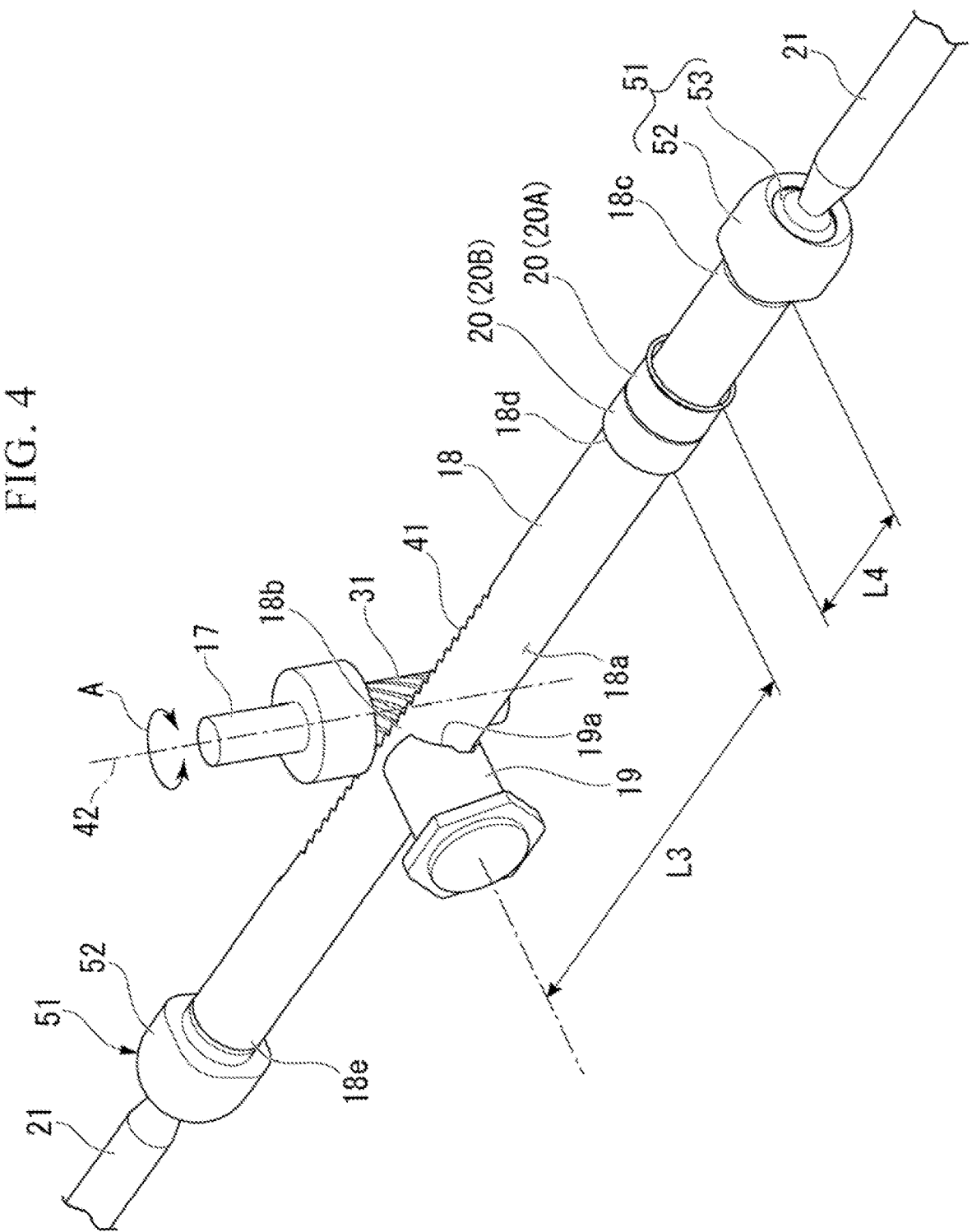
FIG. 4 is a perspective view showing a state in which a casing is omitted from the steering gearbox of the embodiment.

FIG. 4 is a perspective view showing a state in which the casing 16 is omitted from the steering gearbox 15.

As shown in FIG. 4, the rack shaft 18 has a rack gear 41 extending in the axial direction at a position facing the pinion gear 31 of the pinion shaft 17 in a front-rear direction. The rack gear 41 is meshed with the pinion gear 31.

The guide 19 (including a rack guide, a screw, a spring, etc.) is in contact with a side of the rack shaft 18 opposite to the pinion gear 31. The guide 19 is fixed to the casing 16 and has a curved portion 19a at its tip. The curved portion 19a is formed in a concave curved shape along an outer peripheral surface 18a of the rack shaft 18. As a result, the substantially central portion 18b of the rack shaft 18 is supported by the guide 19 to be movable in the axial direction.

As a result, the central portion 18b of the rack shaft 18 is supported in a state of being sandwiched in the front-rear direction by the guide 19 and the pinion gear 31. In this state, when the pinion shaft 17 rotates about the axis 42 in the direction of arrow A, the rotational force of the pinion shaft 17 is transmitted to the rack gear 41 via the pinion gear 31. As a result, the rack shaft 18 moves in the axial direction.

Here, the pinion shaft 17 is connected to the steering wheel 12 (see FIG. 1) via a steering shaft (not shown) or the like. Therefore, when the driver rotates the steering wheel 12, the rack shaft 18 moves in the axial direction.

<Bush>

Figure 5:
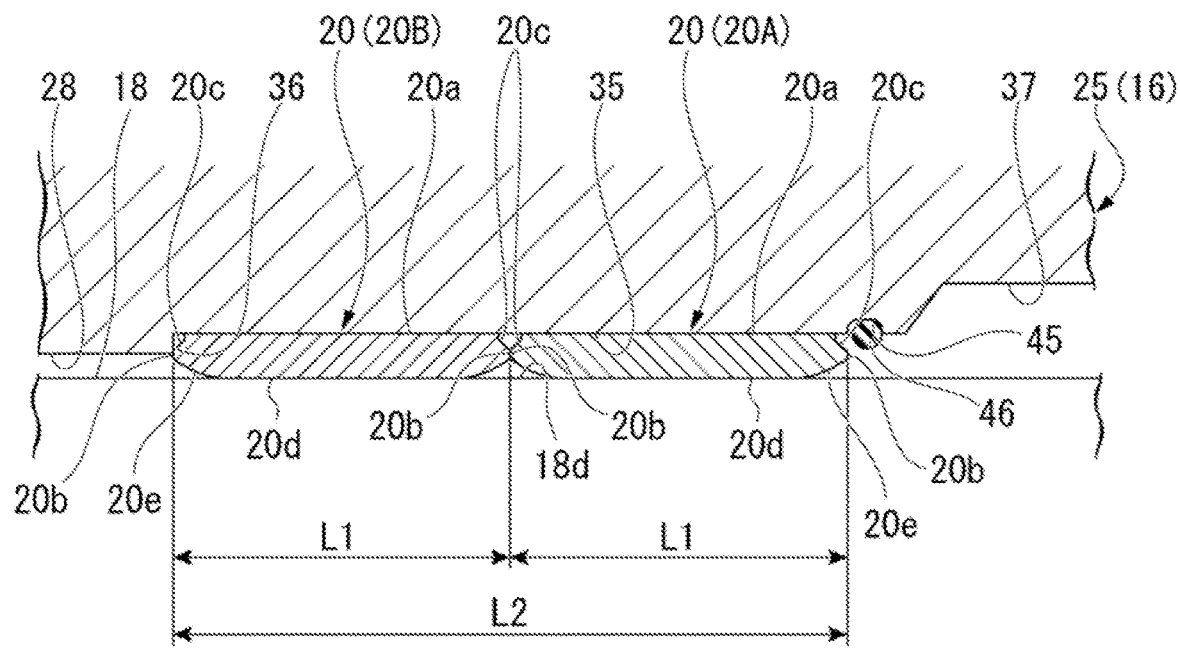
FIG. 5 is an enlarged cross-sectional view of a part V of FIG. 3.

FIG. 5 is an enlarged cross-sectional view of a portion V of FIG. 3.

As shown in FIGS. 4 and 5, the bush 20 has a cylindrical shape disposed coaxially with the axial direction. The bushes 20 are attached inside the first enlarged diameter portion 35 of the casing 16 side by side in the axial direction. In the embodiment, although two bushes 20 are shown as the plurality of bushes 20 as an example, the number of bushes 20 can be arbitrarily selected. The two bushes 20 are, for example, metal bushes of the same member formed of an iron-based sintered material. However, each of the bushes 20 does not have to be made of a sintered material as long as it is made of metal, and they may be made of different materials.

The bush 20 has, for example, a bush length L1 of 15 mm in the axial direction. Therefore, by disposing two bushes 20 in the axial direction, a bush length L2 of the two bushes 20 is set to 30 mm. The bush length L1 of the bush 20 is not limited to 15 mm, and may be arbitrarily selected depending on the intended use. In this case, the bush length L2 of the two bushes 20 is preferably in the range of about 10 mm to 50 mm, and more preferably set in the range of about 15 mm to 45 mm.

The bush 20 has an outer chamfered portion 20c formed in a part of both end portions in which the outer peripheral surface 20a and the end surface 20b intersect each other. Further, the bush 20 has an inner chamfered portion (chamfered portion) 20e formed in a part of both end portions in which the inner peripheral surface 20d and the end surface 20b intersect each other. In this way, since the outer chamfered portion 20c and the inner chamfered portion 20e are formed at both end portions, the area of the end surface 20b of the bush 20 is suppressed to be small. As a result, the end surface 20b of the bush 20 is accurately formed of the sintered material.

By forming the inner chamfered portion 20e at both end portions of the bush 20, an intersection angle of the part in which the inner peripheral surface 20d and the inner chamfered portion 20e intersect each other can be increased to an obtuse angle. As a result, the strength of the part in which the inner peripheral surface 20d and the inner chamfered portion 20e intersect each other is secured.

When the two bushes 20 are inserted into the first enlarged diameter portion 35 from the second opening portion 34 (see FIG. 3) of the second accommodating portion 28 via the second enlarged diameter portion 37, the two bushes 20 can be held inside the first enlarged diameter portion 35.

Hereinafter, among the two bushes 20, the bush 20 located closer to the second enlarged diameter portion 37 is referred to as a 'first bush 20A', and the bush 20 located on the side opposite to the second enlarged diameter portion 37 with respect to the first bush 20A is referred to as a 'second bush 20B'.

The end surface 20b of the second bush 20B on one end side in the axial direction (a direction facing the side opposite to the second opening portion 34) is axially close to or in contact with the step portion 36. The end surface 20b on one end side of the first bush 20A abuts on (is in contact with) the end surface 20b on the other end side (in a direction facing the second opening portion 34) of the second bush 20B. The end surface 20b on the other end side of the first bush 20A faces the second opening portion 34.

An annular groove 45 is formed in the portion of the first enlarged diameter portion 35 located on the side closer to the second opening portion 34 than the end surface 20b on the other end side of the first bush 20A. A snap ring (a stopper) 46 is locked in the annular groove 45. The snap ring 46 is axially close to or in contact with the other end of the first bush 20A (the outer other end of the plurality of bushes 20). In this way, the two first bushes 20A and the second bushes 20B are continuously held in the first enlarged diameter portion 35 in the axial direction by the step portion 36 and the snap ring 46.

In this state, a portion 18d of the rack shaft 18 near the other end portion 18c is supported by the two first bushes 20A and the second bushes 20B to be movable in the axial direction. That is, in the rack shaft 18, the central portion 18b is supported by the guide 19 and the pinion gear 31, and the portion 18d near the other end portion 18c is supported by the two first bushes 20A and the second bush 20B to be movable in the axial direction.

As shown in FIGS. 2 and 3, retainers 52 are provided at both end portions 18c and 18e of the rack shaft 18, respectively. A spherical portion 53 of the tie rod 21 is slidably connected to the inner peripheral surfaces of the retainers 52. A ball joint 51 is made up of the retainer 52 and the spherical portions 53. That is, the tie rod 21 is connected to both end portions 18c and 18e of the rack shaft 18 by the ball joint 51. As a result, the tie rod 21 connects the front wheel 5 and the rack shaft 18 to be swingable between the front wheel 5 and the rack shaft 18. The ball joint 51 is covered with a dustproof boot 55 formed to be stretchable.

Next, the reason why the rack shaft 18 is supported by the two bushes 20 will be described on the basis of FIGS. 1 to 3 and 6.

Figure 6:
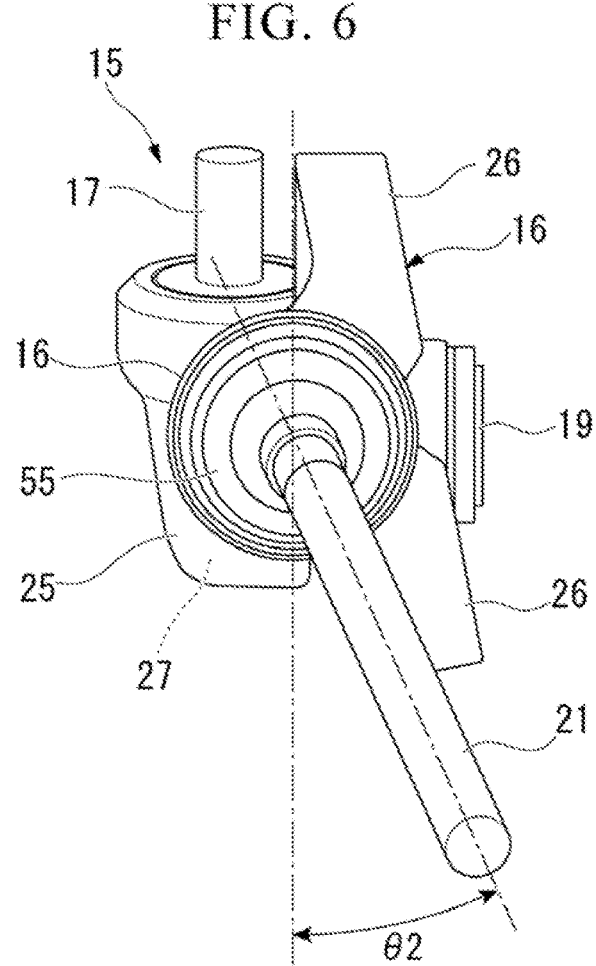
FIG. 6 is a diagram taken along an arrow VI of FIG. 2.

FIG. 6 is a diagram taken along an arrow VI of FIG. 2.

As shown in FIGS. 2 and 6, the tie rod 21 is tilted downward at a tie rod angle θ1 and tilted forward of the vehicle body at a tie rod angle θ2 with the retainer 52 as an axis. The tie rod angle θ1 and the tie rod angle θ2 are set to have a larger tilt angle than the steering gearbox of a general buggy 1.

As shown in FIGS. 1 and 3, the load applied from the front wheels 5 is transmitted to the rack shaft 18 via the tie rod 21 while the buggy 1 is traveling. Therefore, when the tilt angles of the tie rod angle θ1 (see FIG. 2) and the tie rod angle θ2 (see FIG. 6) are set to be large, among the component forces acting on the rack shaft 18 via the wheels (the rear wheels 4 and the front wheels 5), the components along the vertical direction are relatively large. That is, the load that displaces the rack shaft 18 in the direction of falling with respect to the axial direction increases. Hereinafter, the load that displaces the rack shaft 18 in the direction of collapsing with respect to the axial direction may be referred to as a 'displacement load'.

Therefore, in the steering gearbox 15, the rack shaft 18 is supported by two bushes 20 to be movable in the axial direction. Therefore, an axial bush length L2 (see FIG. 5) of the entire two bushes 20 can be made larger than that of one bush 20. That is, the contact area between the rack shaft 18 and the two bushes 20 can be increased. As a result, the surface pressure due to the load transmitted to the two bushes 20 can be reduced, and the strength of the two bushes 20 can be suitably secured.

The collapse of the rack shaft 18 is regulated by coming into contact with diagonally located portions at both end opening edges of the bush 20. Therefore, by increasing the bush length L2 of the entire two bushes 20, the timing at which the rack shaft 18 comes into contact with the bushes 20 becomes earlier. This makes it possible to suitably suppress the displacement due to the collapse of the rack shaft 18.

Further, by providing the two bushes 20 in the axial direction, each bush 20 can move relative to each other by an amount of rattling between the bush 20 and the casing 16 or between the respective bushes 20. Therefore, as compared with a case where the bush length L2 is secured by one bush, it becomes easier for each bush 20 to preferably follow the displacement due to the collapse of the rack shaft 18. Therefore, for example, the deformation of the two bushes 20 due to the rack shaft 18 can be suppressed.

The two bushes 20 are made of the same member. Therefore, it is not necessary to form various bushes having different shapes, the manufacturing cost of the two bushes 20 can be suppressed, and defective bush 20 can be made less likely to occur.

Further, by forming the two bushes 20 with the same member, for example, the inner diameter accuracy of the inner peripheral surfaces 20d of the two bushes 20 can be equally ensured. This makes it possible to support the rack shaft 18 by the two bushes to be smoothly movable in the axial direction.

In addition, since the two bushes 20 are made of the same member, for example, even if settling (deformation) occurs on the inner peripheral surface 20d in one of the two bushes 20, the collapse of the rack shaft 18 can be sufficiently suppressed by the other bush 20.

Here, by using the two bushes 20, for example, when the rack shaft 18 is displaced due to collapse, the rack shaft 18 comes into contact with both end edges of each bush 20 in the axial direction. As a result, when the rack shaft 18 is displaced due to collapse, the rack shaft 18 can be supported by the disposed two bushes 20 in a well-balanced manner.

Since the rack shaft 18 comes into contact with the chamfered portion 20d by the displacement due to collapse of the rack shaft 18, it is possible to reduce the surface pressure acting between the rack shaft 18 and the bush 20.

Further, since the outer chamfered portion 20c and the inner chamfered portion 20e are formed at both end portions of the bush 20, the area of the end surface 20b is suppressed to be small. Therefore, the end surface 20b of the bush 20 is accurately formed of a sintered material. Therefore, the end surface 20b on one end side of the first bush 20A can be satisfactorily brought into contact with the step portion 36. The end surface 20b on the other end side of the first bush 20A and the end surface 20b on one end side of the second bush 20B can be satisfactorily brought into contact with each other. This makes it possible to accurately dispose the two first bushes 20A and the second bushes 20B in the axial direction, and the rack shaft 18 can be smoothly moved in the axial direction.

In addition, since the outer chamfered portion 20c and the inner chamfered portion 20e are formed at both end portions of the bush 20, the bush 20 can be made lighter. Insertability of the bush 20 into the casing 16 can also be improved.

Although an example in which the outer chamfered portion 20c and the inner chamfered portion 20e are formed at both end portions of the bush 20 has been described in the embodiment, the present invention is not limited thereto. As another example, for example, one of the outer chamfered portion 20c and the inner chamfered portion 20e may be formed at both end portions of the bush 20.

The two bushes 20 are held in the first enlarged diameter portion 35 in a state of being continuous by the step portion 36 and the snap ring 46. As a result, because the axial movement of the bush 20 with respect to the casing 16 can be regulated, the load transmitted from the rack shaft 18 can be suitably supported by the entire two bushes 20, and the displacement due to the collapse of the rack shaft 18 can be suitably regulated by the two entire bushes 20.

Further, the two bushes 20 are formed of, for example, an iron-based sintered material.

Here, for example, when a bush having a large bush length is formed of a sintered material, it is difficult to form a thin bush, and it is necessary to form the bush thickly. When the bush is formed thickly, the inner diameter of the first enlarged diameter portion 35 that accommodates the bush increases, and the appearance of the casing increases.

Therefore, the rack shaft 18 is supported by the two bushes 20. Therefore, the bush length L1 of each bush 20 can be suitably suppressed, and the two bushes 20 can be formed thinly with an iron-based sintered material. As a result, the inner diameter of the first enlarged diameter portion 35 that accommodates the two bushes 20 can be suppressed to be small, and the appearance of the casing 16 can be reduced.

Modified Example

Although an example in which the two bushes 20 are made of the same member has been described in the aforementioned embodiment, the present invention is not limited thereto. As another example, the two bushes may be made up of a first bush 80 and a second bush 81 having different bush lengths from each other.

Figure 7:
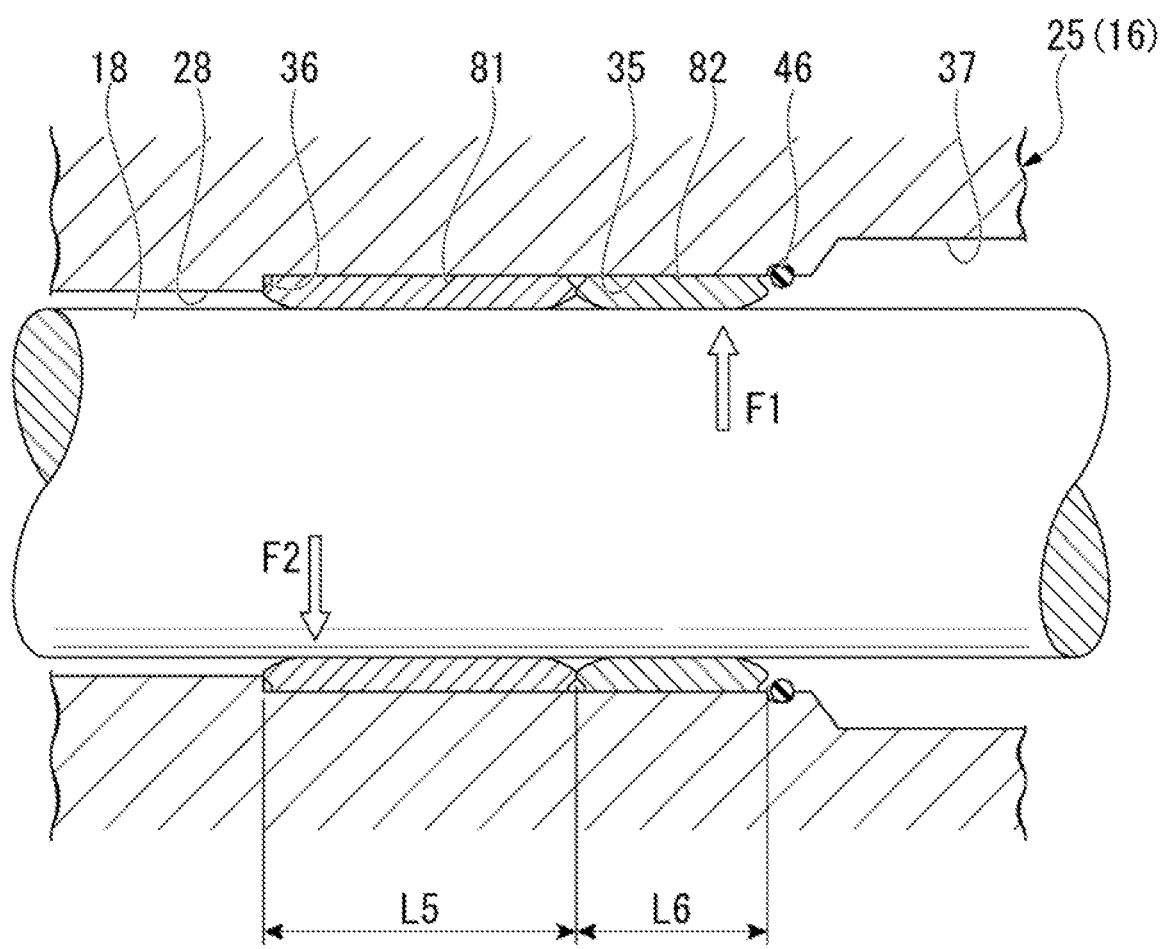
FIG. 7 is a cross-sectional view showing a state in which a rack shaft is supported by a first bush and a second bush of a modified example of the embodiment.

Hereinafter, the first bush 80 and the second bush 81 of the modified example will be described on the basis of FIGS. 4 and 7. FIG. 7 is a cross-sectional view showing a state in which the rack shaft 18 is supported by the first bush 80 and the second bush 81 of the modified example.

An amount of protrusion of the rack shaft 18 from the second bush 81 (a distance L3 from the end surface 20b to the guide 19 (see FIG. 4)) is greater than an amount of protrusion from the first bush 80 (a distance L4 (see FIG. 4) from the end surface 20b to the other end portion 18c)). In this state, when the rack shaft 18 is displaced due to collapse and the pressing force is transmitted from the rack shaft 18 to the two bushes 80 and 81, the pressing force is transmitted first to the second bush 20B among the two bushes 80 and 81 (the rack shaft 18 is pressed). Therefore, as shown in FIG. 7, the first bush 80 and the second bush 81 are formed to have different axial lengths from each other. Specifically, the second bush 81 is disposed on the side closer to the guide 19 (see FIG. 4) than the first bush 80, and the bush length L5 of the second bush 81 is formed to be larger than the bush length L6 of the first bush 80.

Therefore, when the loads F1 and F2 of the rack shaft 18 displaced due to the collapse are transmitted to the first bush 80 and the second bush 81, they are first transmitted to the second bush 81. As a result, the load F2 transmitted from the rack shaft 18 can be satisfactorily supported by the second bush 81 having a large bush length L5, the strength of the two bushes 80 and 81 can be suitably secured, and further, the displacement due to the collapse of the rack shaft 18 can be suitably regulated.

The technical scope of the present invention is not limited to each of the aforementioned embodiments, and includes various modifications to the aforementioned embodiments without departing from the spirit of the present invention. For example, although the step portion 36 is shown as a protrusion in the aforementioned embodiment, the present invention is not limited thereto. As another example, for example, another member such as a snap ring may be used as a protrusion. A regulation member that regulates the movement of the bush 20 may be provided on both sides of each bush 20 in the axial direction, respectively.

Although the configuration in which the two bushes 20 are close to each other or in contact with each other in the axial direction has been described in the aforementioned embodiment, the present invention is not limited to this configuration. The bushes 20 may be separated from each other in the axial direction.

Although the configuration in which the chamfered portions 20c and 20e are formed on the bush 20 has been described in the aforementioned embodiment, a configuration which does not have the chamfered portions 20c and 20e may be provided.

In addition, it is possible to replace the components in the aforementioned embodiment with well-known components as appropriate without departing from the spirit of the present invention, and the aforementioned modified examples may be appropriately combined.

What is claimed is:

1. A steering gearbox comprising:
   a pinion shaft having a pinion gear;
   a rack shaft having a rack gear meshing with the pinion gear;
   a tie rod swingably connected between the rack shaft and wheels; and
   a casing configured to support the rack shaft to be movable in an axial direction via a plurality of bushes,
   wherein the plurality of bushes are provided side by side in the axial direction and each are made of metal,
   wherein inner chamfered portions are formed in both end portions of an inner peripheral surface of each of the plurality of bushes in the axial direction, and
   wherein outer chamfered portions are formed in both end portions of an outer peripheral surface of each of the plurality of bushes in the axial direction.

2. The steering gearbox according to claim 1, wherein all of the plurality of bushes are the same.

3. The steering gearbox according to claim 1, wherein the plurality of bushes are two bushes disposed in the axial direction.

4. The steering gearbox according to claim 1, wherein the plurality of bushes are collectively held between a protrusion formed on the casing and a stopper fitted in the casing such that an outer peripheral surface of each of the plurality of bushes comes into contact with an inner peripheral surface of the casing.

5. The steering gearbox according to claim 1, wherein the plurality of bushes include a first bush, and a second bush having a dimension in the axial direction longer than that of the first bush, an amount of protrusion of the rack shaft in the axial direction from the second bush is longer than an amount of protrusion in the axial direction from the first bush.

6. The steering gearbox according to claim 1, wherein the plurality of bushes are made of a sintered material.

* * * * *